United States Patent [19]

Leiter

[11] 4,132,891
[45] Jan. 2, 1979

[54] EXPOSURE MEASURING SYSTEM FOR MICROSCOPE ATTACHED CAMERAS

[75] Inventor: Herbert Leiter, Wetzlar, Fed. Rep. of Germany

[73] Assignee: Ernst Leitz Wetzlor GmbH, Marl, Fed. Rep. of Germany

[21] Appl. No.: 824,608

[22] Filed: Aug. 15, 1977

[30] Foreign Application Priority Data

Aug. 30, 1976 [DE] Fed. Rep. of Germany ....... 2639020

[51] Int. Cl.² .............................................. G01D 5/34
[52] U.S. Cl. ..................................... 250/239; 356/219
[58] Field of Search ....................... 250/201, 216, 239; 356/218, 219, 22 S; 350/19

[56] References Cited

U.S. PATENT DOCUMENTS

| | | | |
|---|---|---|---|
| 2,910,913 | 11/1959 | Michel | 350/19 |
| 3,827,811 | 8/1974 | Kato et al. | 356/19 |

*Primary Examiner*—David C. Nelms
*Attorney, Agent, or Firm*—Gilbert L. Wells

[57] ABSTRACT

Exposure measuring system for attachment cameras to microscopes provided with a focusing telescope which is provided with a transverse slot for the selective insertion of two sliders, one of which is provided at the approximate slider center with a photodetector for the exposure measuring system while the other consists of a transparent plate which bears a marking of circular shape or the like also approximately at the center of the slider and corresponding in size to that of the photodetector. The slot possibly serves only for the introduction of a single slider bearing both the photodetector and the marking a given distance apart and is correspondingly displaceable between two positions. The guide path (10) of the slider(s) (9) is displaceable in the plane of the slider and means (16) actuated from outside the focusing telescope are provided to cause slider displacement.

5 Claims, 6 Drawing Figures

4,132,891

EXPOSURE MEASURING SYSTEM FOR MICROSCOPE ATTACHED CAMERAS

CROSS REFERENCE TO A RELATED APPLICATION

Applicant claims priority under 35 USC 119 for application P 26 39 020.5 filed Aug. 30, 1976 in the Patent Office of the Federal Republic of Germany.

BACKGROUND OF THE INVENTION

The present invention relates to an exposure measuring system for a microscope attached camera wherein a photodetector may be inserted into the path of the beam of a focusing telescope.

It is known to the prior art with respect to the use of such attachment cameras to provide a focusing telescope provided with an aperture for introducing a slider into the path of the beam. Using such sliders, a reticle for observation or also a photodetector for exposure measurement is selectively introduced. The reticle and photodetector may be mounted a given distance apart on the same support. Besides the format markings, the reticle is also provided at the center with another marking, for instance a circle serving on one hand as a focusing means and on the other corresponding approximately to the size of the photodetector and therefore indicating the location at which the exposure measurement takes place. Such a microscope is disclosed in U.S. Pat. No. 2,910,913.

However, measuring the exposure rigidly at the center of the image entails the drawback that the site of the preparation typical of a general object transmissivity must be nearly at the center for an accurate exposure measurement. This is rarely the case from the start and the preparation must be displaced until such a representative site is at the center.

SUMMARY OF THE INVENTION

Having in mind the limitation of the prior art where it is difficult to center the preparation it is an object of the present invention to remedy this drawback.

This object is achieved by making displaceable the guidance path of the slider(s) in the slider plane and by providing means actuated outside the focusing telescope for effecting the slider displacement.

When the markings and the photodetector are mounted on separate sliders, the guidance path at the same time also limits the depth of introduction of the sliders, whereby the latter always will be at a definite position with respect to the displaceable guide path.

In a particular embodiment however the present invention mounts the photodetector and the marking a distance apart on a common slider in such a manner that the mere displacement of this single slider in the guide path places either the marking or the photodetector into the beam path. In such a case the guide path is provided with a spring detent and the slider with two corresponding indexing grooves defining the two slider positions.

The means for displacing the guide path may be arbitrary. However it is recommended and preferred to make use of adjustment screws known per se and recommended herein and which subtend between them an angle of 120° approximately, and to stress the guide path by a compression spring.

Because the slider of the present invention can move in its plane in the x- and y-directions and no longer assumes a defined position, it may no longer carry as before the format markings for the image field. It is suggested therefore to put the format marking on a separate plate not displaced with the slider but rather mounted to be spatially fixed within the focusing telescope. However, an image of the format marking may be quasi-reflected by means of a beam splitter from the rear into the slider plane. This offers the advantage of superposing a bright format marking on a dark microscope image.

Because the slider may move in the x- and y-directions, the clearance through the slider, that is, the glassplate bearing the markings of the measuring field, must evidently be large enough for the field of observation of the focusing telescope not being restricted even for maximum lateral offset of the guide path by means of the slider.

BRIEF DESCRIPTION OF THE DRAWINGS

The drawings illustrate the present invention by means of embodiments wherein a single slider is provided both with the markings of the measuring field and the photodetector and wherein two sliders are provided.

DESCRIPTION OF THE PREFERRED EMBODIMENTS

Figure 1:
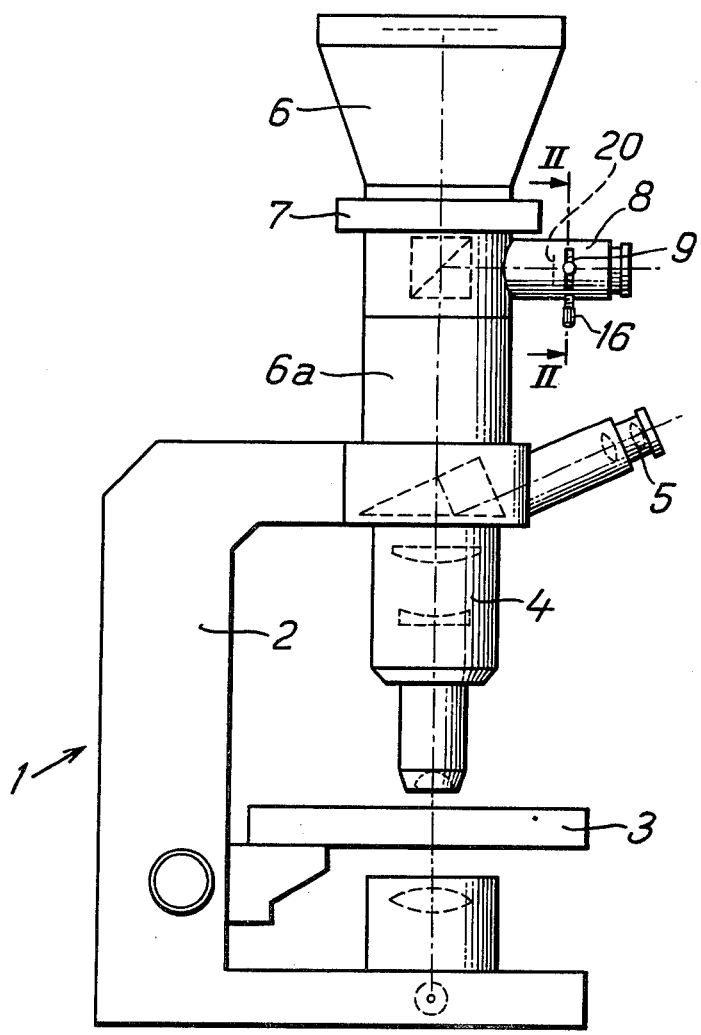
FIG. 1 is a schematic showing of a microscope with an attachment camera and focusing telescope and a slider displaceable in its x- and y-plane.

FIG. 1 shows a microscope 1 consisting of a stand 2, a stage 3 and a main tube 4 and an ocular 5, among other elements.

An attachment camera 6 with a tube 6a is mounted on main tube 4 and is provided with a shutter 7 and a focusing telescope 8. A format marking is provided inside this telescope at 20 by means of which that part of the object may be seen in the telescope which is reproduced on the film or plate of the camera.

The viewing telescope is provided with a transverse slot for a slider(s) 9 displaceable within this slot to-and-fro normally to the optic axis.

Figure 2:
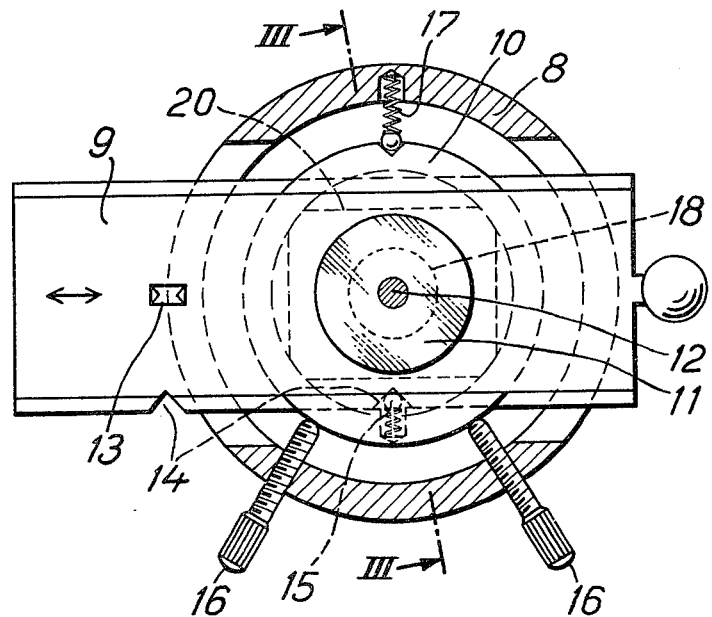
FIG. 2 is a section through FIG. 1 at II—II, on an enlarged scale, with a single movable slider.
Figure 3:
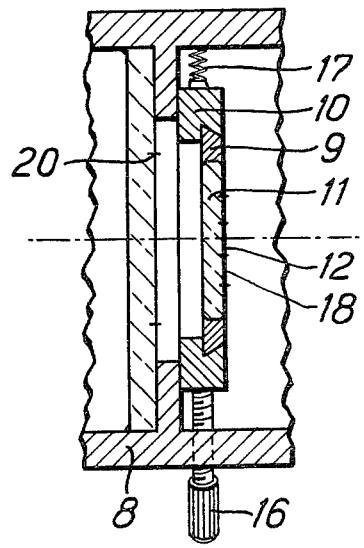
FIG. 3 is a section through the slider and its guide path along line III—III of FIG. 2.
Figure 4A:
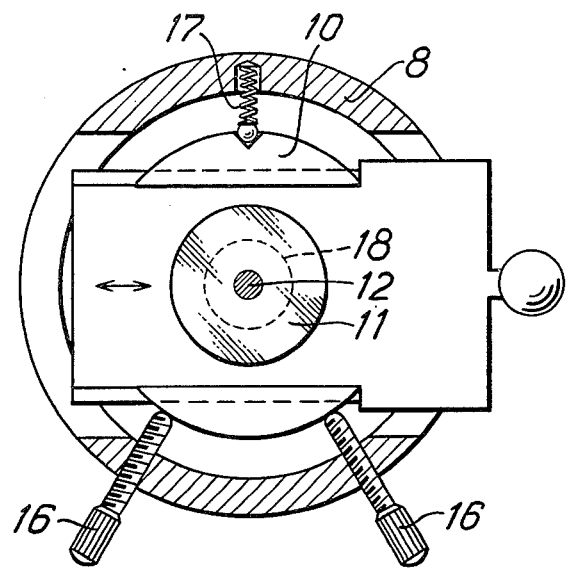
FIG. 4a is a section through FIG. 1 at II—II, on an enlarged scale, showing a first slider carrying a marking.
Figure 4B:
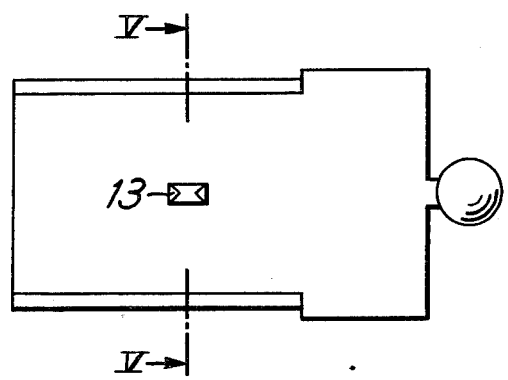
FIG. 4b shows a second slider carrying a photodetector.
Figure 5:
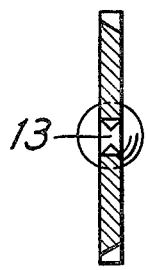
FIG. 5 is a section through FIG. 4b along line V—V.

The single slider proper and its guidance are shown in detail in FIGS. 2 and 3. The slider is rectangular and dove-tailed at its lengthwise edges. In this manner it engages the dove-tailed groove of a guide path 10 within which it is displaceable in the direction of the double arrow.

A hole is provided approximately at the center of slider 9 and covered by means of a glass plate 11. A circle 12 on that glass plate marks the spot of which the brightness is being measured. This brightness measurement is performed by a photodetector 13 which is also mounted on slider 9. During observation and measurement, the slider is displaced each time by the distance between hole center and photodetector center, such positions being determined by a detent or indexing system. Slider 9 is provided to that end with indexing groove 14, the guide path 10 being provided with a spring-stressed indexing pin 15.

The entire guide path together with slider 9 therefore can now be displaced over a wide range of the slider plane by means of adjustment screws 16 subtending an angle between themselves and turning against or away from tube 6a. This is done against the force of a spring 17 acting from the opposite side through a ball on guide path 10. The displacement range is so large that both the circle 12 and evidently also the photodetector 13 may be displaced over the entire viewing field of the microscope denoted by a circle 18. The instrument of the present invention therefore allows carrying out exposure-measurements at any point of the viewing field without displacing the preparation on the stage, whereas previously the exposure measurements could be carried out only at the image center.

I claim:

1. In an exposure measuring system for attachment cameras to microscopes provided with a focusing telescope having a transverse slot for the selective insertion of two sliders, one of which is provided at the approximate slider center with a photodetector for the exposure-measuring system while the other consists of a transparent plate which bears a marking of circular shape or the like also approximately at the center of the slider and corresponding in size to that of the photodetector, the improvement comprising: said transverse slot having a guide path (10) of the sliders (9) displaceable in the plane of the slider and in that displacement means (16) actuated from outside the focusing telescope are provided to cause slider displacement.

2. The exposure measuring system as defined in claim 1, wherein said guide path consists of a guide-slot provided plate acted on one side by a compression spring (17) and on the other by two screws (16) subtending an angle between them and representing said displacement means.

3. Exposure measuring system for attachment cameras to microscopes provided with a focusing telescope having a transverse slot for the selective insertion of a single slider provided at the approximate slider center with a photodetector for the exposure measuring system and a transparent plate which bears a marking of circular shape or the like also approximately at the center of the slider and corresponding in size to that of the photodetector, said slot serving only for the introduction of said single slider bearing both the photodetector and the marking a given distance apart and correspondingly displaceable between two positions, wherein said transverse slot has a guide path (10) of the slider (9) displaceable in the plane of the slider and in that displacement means (16) actuated from outside the focusing telescope are provided to cause slider displacement.

4. The exposure measuring system as defined in claim 3, wherein said guide path consists of a guide slot provided plate acted on one side by a compression spring (17) and on the other by two screws (16) subtending an angle between them and representing said displacement means.

5. The exposure measuring system as defined in claim 4, wherein said guide path is provided with a spring detent or index (13) and said slider is provided with two indexing grooves (14) the positions of which correspond to that of the marking (12) and of photodetector (13).

* * * * *